United States Patent [19]

Nordby et al.

[11] Patent Number: 5,447,414
[45] Date of Patent: Sep. 5, 1995

[54] CONSTANT AIR FLOW CONTROL APPARATUS AND METHOD

[75] Inventors: Craig Nordby, Chesterfield; John S. Thorn; James Skinner, both of Florissant, all of Mo.

[73] Assignee: Emerson Electric Co., St. Louis, Mo.

[21] Appl. No.: 250,296

[22] Filed: May 27, 1994

[51] Int. Cl.⁶ .............................................. F04B 49/06
[52] U.S. Cl. ........................................ 417/20; 417/42;
     417/44.1; 417/44.11; 388/907.5; 388/929;
     318/432
[58] Field of Search ............... 417/20, 42, 44.1, 44.11,
     417/53; 318/432, 644; 388/809–815, 907.5, 929

[56] References Cited

U.S. PATENT DOCUMENTS

| | | | |
|---|---|---|---|
| 4,467,706 | 8/1984 | Batcheller et al. | 98/1.5 |
| 4,554,492 | 11/1985 | Karpowicz et al. | 388/907.5 |
| 4,638,233 | 1/1987 | Erdman | 318/644 |
| 4,806,833 | 2/1989 | Young | 318/335 |
| 4,933,614 | 6/1990 | Kawata | 388/929 |
| 4,978,896 | 12/1990 | Shah | 318/254 |
| 5,019,757 | 5/1991 | Beifus | 318/254 |
| 5,163,818 | 11/1992 | Betsill et al. | 417/18 |
| 5,202,951 | 4/1993 | Doyle | 388/811 |
| 5,269,660 | 12/1993 | Pradelle | 417/20 |

FOREIGN PATENT DOCUMENTS

1381675  3/1988  U.S.S.R. .................. 388/815

*Primary Examiner*—Richard A. Bertsch
*Assistant Examiner*—Xuan M. Thai
*Attorney, Agent, or Firm*—Polster, Lieder, Woodruff & Lucchesi

[57] ABSTRACT

Air handling apparatus (10) for delivering a volume of air at a generally constant flow rate regardless of changes in the operating conditions of a system with which the apparatus is used. A blower (12) pushes air from one point to another. The blower is operated by a blower motor (14). A switch (16) controls application of power to the motor. Sensors (20) are used to sense the voltage supplied to the motor, the current drawn by the motor, and the motor's operating speed. A flow controller (22) establishes a desired air flow rate to be provided by the blower. A processor (18) is responsive to the sensed voltage (V), current (I), and speed (S), an input (C) from the flow controller, and constants (K1-K4) related to performance characteristics of the blower to determine a torque required by the motor to produce a predetermined air flow rate. The torque value is determined as a function of the combined motor speed input from the sensor and an input from the flow controller. The processor is responsive to a calculated torque value for the motor. The processor supplies a control signal to the switch to control application of a voltage to the motor. This voltage is sufficient for the motor to produce the calculated torque. The processor includes feedback (28) by which the control signal can be modified first in response to the sensed current drawn by the motor; and additionally, by the voltage supplied to the motor.

31 Claims, 4 Drawing Sheets

DATA POINTS

| SPEED | CFM | TORQUE |
|---|---|---|
| 600 | 1400 | 25 |
| 1040 | 1400 | 38 |
| 250 | 600 | 3 |
| 450 | 600 | 5 |

COEFFICIENT MATRIX

| SPEED×CFM | SPEED | CFM | OFFSET |
|---|---|---|---|
| 840000 | 600 | 1400 | 1 |
| 1456000 | 1040 | 1400 | 1 |
| 150000 | 250 | 600 | 1 |
| 270000 | 450 | 600 | 1 |

INVERSE OF COEFFICIENT MATRIX

| | | | |
|---|---|---|---|
| -2.8E-06 | 2.8E-06 | 6.2E-06 | -6.2E-06 |
| 0.001705 | -0.0017 | -0.00875 | 0.00875 |
| 0.002955 | -0.0017 | -0.00281 | 0.001562 |
| -1.77273 | 1.022727 | 3.9375 | -2.1875 |

K FACTOR COMPUTATION

K4= 0.000024
K3= -0.00466
K2= 0.008466
K1= -4.57955

CHECK POINTS

POINT 1

| SPEED | CFM | | SPEED×CFM | SPEED | CFM | OFFSET | K FACTOR | INTERMED | CALCULATE TORQUE COMMAND | GRAPH TORQUE READING | TORQUE ERROR |
|---|---|---|---|---|---|---|---|---|---|---|---|
| 430 | 1000 | | 430000 | 430 | 1000 | 1 | 0.000024 | 10.51 | 12.4 | 12.5 | 8.89% |
| | | | | | | | -0.00466 | -2.00 | | | |
| | | | | | | | 0.008466 | 8.47 | | | |
| | | | | | | | -4.57955 | -4.58 | | | |
| | | | | | | | | 12.39 | | | |

POINT 2

| SPEED | CFM | | | | | | | | | | |
|---|---|---|---|---|---|---|---|---|---|---|---|
| 750 | 1000 | | 750000 | 750 | 1000 | 1 | 0.000024 | 18.32 | 18.7 | 18.5 | -1.17% |
| | | | | | | | -0.00466 | -3.49 | | | |
| | | | | | | | 0.008466 | 8.47 | | | |
| | | | | | | | -4.57955 | -4.58 | | | |
| | | | | | | | | 18.72 | | | |

POINT 3

| SPEED | CFM | | | | | | | | | | |
|---|---|---|---|---|---|---|---|---|---|---|---|
| 800 | 1400 | | 1120000 | 800 | 1400 | 1 | 0.000024 | 27.36 | 30.9 | 30 | -3.03% |
| | | | | | | | -0.00466 | -3.73 | | | |
| | | | | | | | 0.008466 | 11.85 | | | |
| | | | | | | | -4.57955 | -4.58 | | | |
| | | | | | | | | 30.91 | | | |

POINT 4

| SPEED | CFM | | | | | | | | | | |
|---|---|---|---|---|---|---|---|---|---|---|---|
| 400 | 600 | | 240000 | 400 | 600 | 1 | 0.000024 | 5.86 | 4.5 | 6 | 25.00% |
| | | | | | | | -0.00466 | -1.86 | | | |
| | | | | | | | 0.008466 | 5.08 | | | |
| | | | | | | | -4.57955 | -4.58 | | | |
| | | | | | | | | 4.50 | | | |

FIG. 5

TRIAL 2

DATA POINTS

| SPEED | CFM | TORQUE |
|---|---|---|
| 600 | 1400 | 25 |
| 1040 | 1400 | 38 |
| 250 | 600 | 3 |
| 450 | 600 | 5 |

| COEFFICIENT MATRIX | | | | INVERSE OF COEFFICIENT MATRIX | | | | K FACTOR COMPUTATION |
|---|---|---|---|---|---|---|---|---|
| SPEED×CFM | SPEED | CFM | OFFSET | | | | | |
| 840000 | 600 | 1400 | 1 | -3.8E-06 | 3.8E-06 | 5.7E-06 | -5.7E-06 | K4= 0.000023 |
| 1456000 | 1040 | 1400 | 1 | 0.00303 | -0.00303 | -0.00875 | 0.00805 | K3= -0.00319 |
| 150000 | 250 | 600 | 1 | 0.003939 | -0.00303 | -0.00227 | -0.00339 | 0.001724 K2= 0.00738 |
| 270000 | 450 | 600 | 1 | -3.15152 | 1.818182 | 4.747126 | -2.41379 | K1= -3.05904 |

CHECK POINTS

|  | | | | | | | CALCULATE TORQUE | GRAPH TORQUE READING | TORQUE ERROR |
|---|---|---|---|---|---|---|---|---|---|
| | SPEED | CFM | SPEED×CFM | SPEED | CFM | OFFSET K FACTOR INTERMED | | | |
| POINT 1 | 430 | 1000 | 430000 | 430 | 1000 | 1 0.000023   10.05 | 13.0 | 12.5 | -4.03% |
| | | | | | | -0.00319  -1.37 | | | |
| | | | | | | 0.00738   7.38 | | | |
| | | | | | | -3.05904  -3.06 | | | |
| | | | | | | 13.00 | | | |
| POINT 2 | 750 | 1000 | 750000 | 750 | 1000 | 1 0.000023   19.52 | 19.5 | 18.5 | -5.22% |
| | | | | | | -0.00319  -2.39 | | | |
| | | | | | | 0.00738   7.38 | | | |
| | | | | | | -3.05904  -3.06 | | | |
| | | | | | | 19.47 | | | |
| POINT 3 | 800 | 1400 | 1120000 | 800 | 1400 | 1 0.000023   26.19 | 30.9 | 30 | -3.03% |
| | | | | | | -0.00319  -2.55 | | | |
| | | | | | | 0.00738   10.33 | | | |
| | | | | | | -3.05904  -3.06 | | | |
| | | | | | | 30.91 | | | |
| POINT 4 | 400 | 600 | 240000 | 400 | 600 | 1 0.000023   5.61 | 5.7 | 6 | 4.91% |
| | | | | | | -0.00319  -1.27 | | | |
| | | | | | | 0.00738   4.43 | | | |
| | | | | | | -3.05904  -3.06 | | | |
| | | | | | | 5.71 | | | |

FIG. 6

CONSTANT AIR FLOW CONTROL APPARATUS AND METHOD

BACKGROUND OF THE INVENTION

This invention relates to air flow control in air handling systems such as heating and cooling systems and, more particularly, to apparatus for providing a constant air flow by a blower used in such systems.

Heating and cooling systems, particularly residential systems are well-known. Such systems commonly employ a blower to push warm or cold air through a duct system depending upon whether the residence is being heated or cooled. The blower is motor operated. The air flow system is designed to operate under a wide variety of conditions which include the volume of space to be heated or cooled, the temperature of the environment, the size and type of ducting used, duct restrictions, etc. One desirable feature of these air handling systems is that they be capable of providing a constant flow rate of air under a wide range of conditions. One method of achieving this constancy is to control operation of the blower motor so its operation varies in response to sensed changes in the system or its operating environment. There are a variety of control schemes which have been employed to control motor operation. Each of these schemes employ a different methodology depending upon the particular desired operating characteristics of the system.

In U.S. Pat. No. 4,978,896, for example, a blower's speed is controlled over a range of static pressure changes to maintain a constant flow rate. A microprocessor is responsive to a preselected flow rate signal and a motor speed signal to generate a motor torque value. A pulse width modulated (PWM) signal is produced by the microprocessor and used to control motor speed so the calculated amount of torque is produced by the motor, enabling the motor to drive the blower at a variable rate which will provide the desired constant air flow rate even though operating conditions change. Co-assigned U.S. Pat. No. 5,019,757 discloses a similar operating scheme but incorporates a comparison function by which the motor's rpm is compared with a calculated target speed with any difference used to adjust an output of the microprocessor to refine the level of control.

Another co-assigned U.S. Pat. No. 4,806,833 describes an air conditioning system in which the blower speed is established to provide a constant volume of air flow for an existing static pressure. The blower speed is subsequently changed in response to changes in the static pressure.

Finally, U.S. Pat. No. 4,476,706, for example, describes an environmental control sytem. The embodiment described is for a tractor cab having two separate blowers, a pressurization blower, and a recirculation blower. The pressurization blower, at constant air flow, is similar to that described in the above co-assigned patents. The occupant of the cab selects the control level of the recirculation blower. The control circuitry is responsive to changes within the cab pressure and system flow restrictions which occur, for example, when an air filter in the system begins to clog up, to maintain a constant flow rate.

Generally, it is a feature of these systems that air flow control, and the maintenance of a constant flow rate of air is a function of motor torque. And, since torque is proportional to motor speed, the slope of the motor's torque/speed curve is proportional to a desired air flow. However, the relationship is not exact, and because of this, the level of control to maintain a desired constant air flow rate, while generally achieved, is not achieved to the greatest extent possible. Also in this regard, control methodologies employing use of the torque/speed curves provide some type of compensation (i.e., gain) in the circuitry used to provide motor drive signals. The gain value used is typically a compromise; and, as a result, is generally excessive for high flow rates of air, and insufficient at lower air flow rates.

SUMMARY OF THE INVENTION

Among the several objects of the present invention may be noted the provision of a method and apparatus for moving air through an air handling system such as a heating or air conditioning system; the provision of such a method and apparatus to provide a constant air flow rate under varying operating conditions; the provision of such a method and apparatus to maintain the air flow rate as function of the speed and torque of a motor used to operate a blower of the system; the provision of such a method and apparatus to develop a motor control signal for use in operating the motor which is also a function of various blower operating characteristics; the provision of such a method and apparatus in which the blower characteristics include speed, torque, pressure, and air flow characteristics of the blower; the provision of such a method and apparatus to include an offset torque value proportional to a desired air flow rate; the provision of such method and apparatus to incorporate a double linear approximation by which a first speed/torque relationship is established for a low range of air flow rates, and a second speed/torque relationship is used for higher flow rates whereby the resulting control signal provides better control than is possible in existing motor control systems; the provision of such a method and apparatus employing a novel torque calculation formula incorporating the blower characteristics outlined above and allowing the resultant speed control signal to be modifiable in response to the instantaneous voltage and current of the blower motor; the provision of such a method and apparatus to include a microprocessor which periodically calculates the required motor torque and generates an appropriate control signal; and, the provision of such a method and apparatus which provides a low cost, reliable motor control which is readily adaptable to a wide variety of air handling systems and motor/blower configurations.

In accordance with the invention, generally stated, air handling apparatus is for delivering a volume of air at a generally constant flow rate regardless of changes in the operating conditions of an environment with which the apparatus is used. A blower pushes air from one point to another. The blower is operated by a blower motor. A switch controls application of power to the motor. Sensors are used to sense the voltage supplied to the motor, the current drawn by the motor, and the motor's operating speed. A flow controller establishes a desired air flow rate to be provided by the blower. A processor is responsive to the sensed voltage, current, and speed, as well as an input from the flow controller to determine a torque required by the motor to produce a predetermined air flow rate. The torque value is determined as a function of the combined motor speed input from the sensor and an input from the flow controller. The processor, which may include a microprocessor, is responsive to the calculated torque value for the motor to supply a control signal to the switch to control application of a voltage to the motor, this voltage being sufficient for the motor to produce the calculated torque. The control signal is modified, first in response to the sensed current, and then in response to the sensed voltage, to produce the control signal ultimately supplied to the switch. A method of motor control to produce a constant air flow rate is also disclosed. Other objects and features will be in part apparent and in part pointed out hereinafter.

BRIEF DESCRIPTION OF THE DRAWINGS

FIG. 5 is a data representation for a first estimation of constants used in a motor torque equation employed in the apparatus; and, FIG. 6 is a similar representation of data for a second and subsequent estimation.

Corresponding reference characters indicate corresponding parts throughout the drawings.

DESCRIPTION OF A PREFERRED EMBODIMENT

Figure 1:
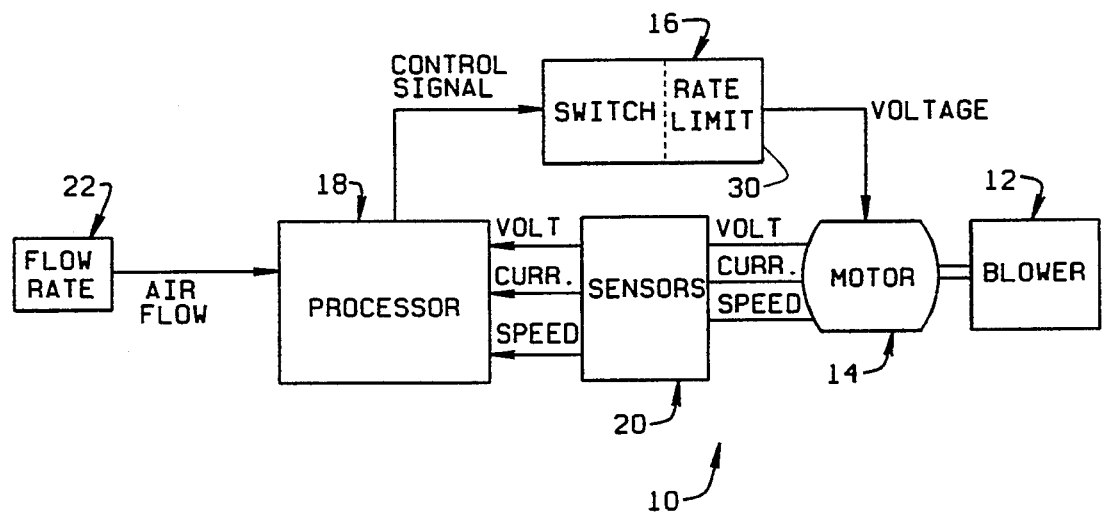
FIG. 1 is a block diagram of apparatus of the present invention for controlling operation of a blower to provide a constant flow rate.

Referring to the drawings, air handling apparatus of the present invention is indicated generally 10 in FIG. 1. Apparatus 10 may be used for delivering hot or cold air from one point to another. Apparatus 10 delivers a volume of air at a generally constant flow rate regardless of changes in the operating conditions of the systems or the environment in which the apparatus is used. Apparatus 10 first includes a blower 12 for moving air from a heater or air conditioner to a desired location. The delivery rate of blower 12 is expressed in cubic feet per minute (CFM). A blower motor 14 is operatively connected to blower 12 for operating the blower. In the preferred embodiment motor 14 is a brushless D.C. motor. Other motor types are compatible with the invention. For example, motor 14 may be a switched reluctance motor, or a conventional single-phase or polyphase motor may be employed without departing from the scope of the invention.

Voltage to the motor is supplied through a switch means 16. Means 16 controls application of power to blower motor 14 in response to control signal inputs from a processor means 18 described hereinafter. When voltage is supplied to the motor, it also draws a current and runs at a particular speed. A sensing means 20 senses the amplitude of the voltage supplied to the motor, the current drawn by the motor, and the motor's operating speed. As will be appreciated by those skilled in the art, sensing means 20 may comprise any of a variety of devices or circuits used to obtain the desired information. Each of these motor operating parameters is converted to a signal supplied as an input to processor means 18. Processor means 18 is also provided an input from a flow control means 22. Means 22 is, for example, a manually operated switch having a plurality of switch positions by which the user can select a desired flow rate of air to be provided by the apparatus. Again, other devices may be used, if desired. Once a desired air flow rate is established, apparatus 10 continues to provide that volume of air even though various changes in system conditions occur.

Processor means 18 is responsive to the sensed voltage, current, and motor speed inputs from each sensor comprising sensing means 20 as well the air flow input from the flow control means 22. Processor means 18 then periodically determines the torque required by motor 14 to produce the predetermined air flow rate. Means 18, for example, makes this determination 65 times/second. The torque calculation performed by the processor means is a function of a combined motor speed input S from sensing means 20, and an input C from flow control means 22. In addition, current, torque, pressure, and air flow characteristics of the blower are used in making the torque calculation. The resultant calculated torque value includes an offset torque value which is a function of the desired constant air flow rate. Processor means 18 is responsive to a calculated torque value for the motor 14 to supply a control signal to switch means 16 to control application of voltage to the motor. Switch means 16 is preferably a six-stage inverter arranged in a conventional configuration when applied to a multiple phase winding configuration for motor 14. Other switch configurations may be used, depending upon the motor configuration. The voltage supplied to motor 14 is sufficient for the motor to produce the calculated torque by which the blower will turn at the correct speed, for a current set of operating conditions, to deliver a constant flow of air.

Figure 2:
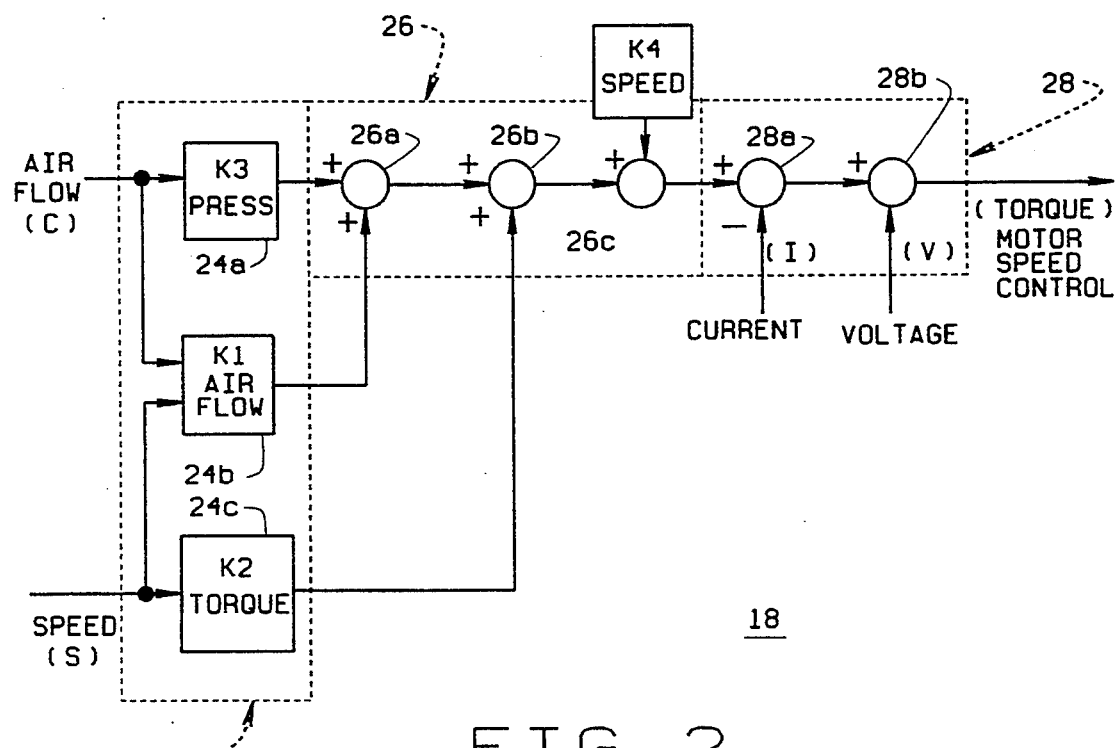
FIG. 2 is a block diagram of a processing means of the apparatus.

Referring to FIG. 2, processor means 18, which can be a microprocessor appropriately programmed, calculates the required torque as $$torque = (K1*S*C) + (K2*S) + (K3*C) + K4 \quad (1)$$

where S is the motor speed input from sensing means 20, and C the air flow rate input from flow control means 22. K1–K4 are constants which are derived for the particular blower 12 operated by motor 14. Constant K1 represents air flow characteristics of the blower. Constant K2 represents the blower's torque characteristics. Constant K3 represents the pressure characteristics of the blower. And, constant K4 represents speed characteristics of the blower. Processor means 18 includes multiplier means 24 to which the respective inputs C and S from the flow control means and the sensing means are supplied. Multiplier means 24 includes a plurality of multipliers 24a–24c for respectively combining these inputs with certain of the blower constants. Input signal C from flow control means 22 is supplied as an input to both multiplier 24a, and multiplier 24b. Input signal S from sensing means 20 is supplied as an input to multiplier 24c, and also as an input to multiplier 24b. In multiplier 24a, the flow control means input C is combined with the constant K3. In multiplier 24b, flow control input C and motor speed input S are combined with each other and with the constant K1. Finally, in multiplier 24c, motor speed input S is combined with constant K2.

Next, processor means 18 includes a summing means indicated generally 26 for additively combining the outputs from the respective multipliers. A first summing means 26a additively combines the output from multipliers 24a, 24b. The output from the summing means is a value (K1*C*S)+(K3*C). At a second summing means 26b, the output from summing means 26a is additively combined with the output of multiplier 24c. The output from this summing means is (K1*S*C)+(K2*S)+(K3*C). Finally, at a third summing means 26c, the output of summing means 26b is additively combined with the constant K4. The output from summing means 26c represents the required motor torque, for the desired air flow and current operating speed of the motor, necessary for blower 12 to maintain a constant flow rate.

Processor means 18 includes feedback means 28 for combining voltage and current outputs (V and I respectively) of sensing means 20 with the additively combined output of multiplier means 24 to produce the control signal supplied to switch means 16. Feedback means 28 includes a summing means 28a for additively combining an output from summing means 26c with the current signal I produced by the sensing means. A summing means 28b combines an output of summing means 28a with the voltage signal V produced by sensing means 20. The now modified output from summing means 26 is the control signal supplied to the switch means. The switch means is responsive to inputs from the processor means to control the time and the amplitude of a voltage supplied to the motor in order for the motor to produce the requisite torque applied to blower 12. In so doing, the switch means includes a rate limiter 30 for controlling the rate of increase or decrease in the amplitude of the voltage supplied to the motor, or the duration of voltage application. This is done to protect both the motor and blower from being overdriven.

Figure 3:
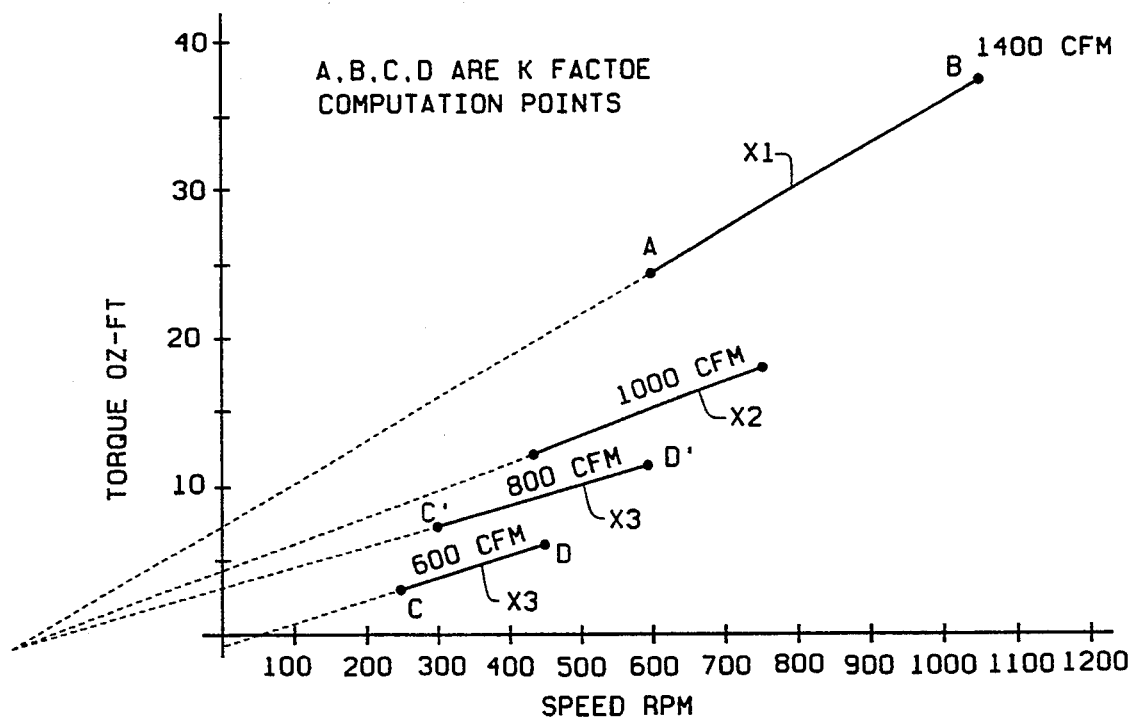
FIGS. 3 and 4 are torque/speed curves for a representative blower with which the apparatus is used.
Figure 4:
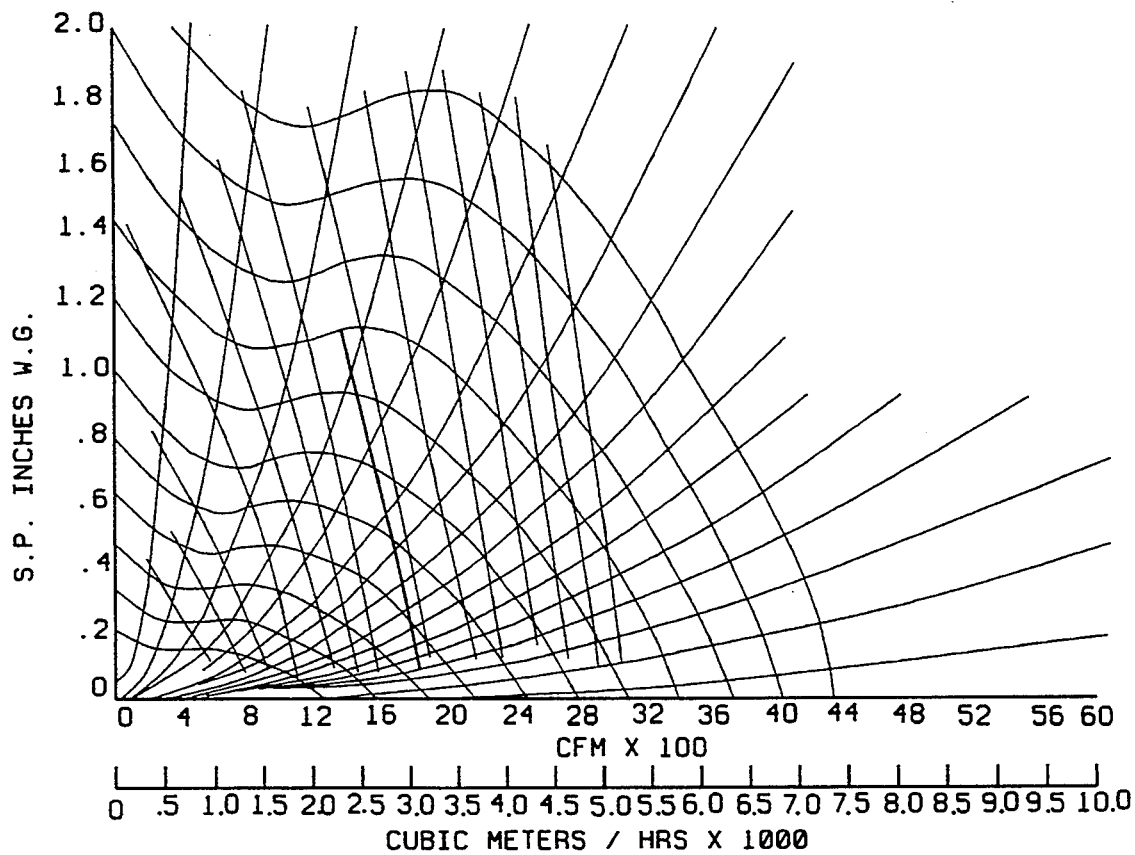

In developing the constant values for use in the above torque equation, it will be understood that constant values can be derived for a wide range of blowers and these values maintained in a or look-up table accessed by the microprocessor. The constants are derived by performing a double linear approximation from the torque speed curves for a blower. In FIGS. 3 and 4, torque/speed curves for a blower manufactured by the Brundage Corporation under their model designation PD1010 are shown. The curves in FIG. 3 are for lower speed ranges of the blower motor, and the curves in FIG. 4 are for the higher speed ranges. In each instance, the respective curves curve be approximated by a straight line. The result is that each can has a first linear approximation for that portion of the curve shown in FIG. 3, and a second linear approximation for the portion of the curve in FIG. 4. This double linear approximation is important because in many existing air handling systems, a gain value is used as part of the control strategy for the motor/blower. The gain value represents blower performance characteristics. The gain value is usually a single value based upon a midpoint of blower characteristics. As such, it is generally too high for upper end blower performance, and too low for lower end air flow rates.

To determine the constants K1–K4 to be used in the torque equation, a plot of constant cubic feet per minute curves is made and these are then approximated by straight lines such as the approximations or line segments X1–X4 in FIG. 3 for 1400, 1000, 800, and 600 CFM respectively. Each CFM line segment has a different slope. In each instance, the line segment can be plotted using the equation $$T = mS + b \qquad (2)$$

where T is torque, S is motor speed, m is the slope of the curve, and b is the torque offset. In each instance, the segments X1–X4 have a different torque offset. Further, slope m is equal to air flow (K1) in CFM plus air pressure (K3). And, torque offset b is equal to torque (K2) plus motor speed (K4). Combining these relationships produces equation (1) above.

In determining the value of the constants, points are selected from curves for the blower. The points are selected at four respective points representing boundaries of an operational envelope for the blower. It will be understood that depending upon the application and system in which the blower is used, these points can vary. Four separate equations each involving four separate unknowns are then developed. Simultaneous solution of these equations produce the respective values for the constants K1–K4. Once this is done, error calculations are performed to determine the percentage of error in the torque calculation. An initial set of data and the results of the calculations are shown in FIG. 5. As shown therein, The corner points for determining the constants are

| Speed   | CFM  | Torque |
|---------|------|--------|
| 600 rpm | 1400 | 25     |
| 1040    | 1400 | 38     |
| 250     | 600  | 3      |
| 450     | 600  | 5      |

These points are taken from the respective line segments X1, X4 in FIG. 3. As shown in FIG. 5, the error between the torque calculated using equation (1) and the torque value obtained from the blower performance curves range between −3.03% and +25.00%.

In FIG. 6, a second determination is made with a new set of boundaries as represented by the line segments X1, X3 in FIG. 3. Now, the error between the calculated torque values and those obtained from the blower performance curves range only between −5.22% and +4.91% which is a narrower band than was obtained from the earlier set of calculations using the different set of constants. Thus, by operating the blower within an appropriate set of limits, the performance of the apparatus and method of the invention employing equation (1) and using the constants K1–K4 will produce a finer degree of motor control than is otherwise possible.

What has been described is a method and apparatus for moving air through an air handling system including a variety of heating and air conditioning systems. It is a feature of the method and apparatus of the invention to provide a constant air flow rate under varying operating conditions. According to the method of the invention and the apparatus described, the air flow rate of the system is maintained as a function of the speed and torque of a motor used to operate a blower of the system. A motor speed signal generated and used to operate the motor is also generated as a function of various blower operating characteristics which include the blower's speed, torque, pressure, and air flow characteristics. These vary from one blower to another. Importantly, the motor speed signal includes an offset torque value which is proportional to a desired air flow rate. The methodology used incorporates a double linear approximation by which a first speed/torque relationship is established for a low range of air flow rates, and a second speed/torque relationship is established for higher flow rates. The resulting control signal provides better control than is possible in existing motor control systems. The method and apparatus of the invention employ a novel torque calculation formula that incorporates the blower speed, torque, pressure and air flow characteristics which allows the resultant speed control signal to be modified in response to instantaneous changes in the blower motor's voltage and current. A microprocessor incorporated in the apparatus periodically calculates the required motor torque and generates an appropriate control signal. The result is a low cost, reliable motor control which is readily adaptable to a wide variety of air handling systems and motor/blower configurations.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. In the air handling system for delivering air by a blower system utilizing a blower having air flow, pressure, torque, and current characteristics and a blower motor for running the blower, apparatus for providing a constant flow rate of air comprising:

first sensing means for sensing the operating speed of the motor;
   second sensing means for sensing the current drawn by the motor;
   third sensing a voltage applied to the motor;
   switch means for controlling application of power to the motor;
   flow control means for establishing a desired air flow rate; and,
   processor means responsive to inputs from each of the sensing means and the flow control means to determine a torque required to be produced by the motor for a predetermined air flow rate, the torque being determined as a function of the combined inputs from the first sensing means and the flow control means together with individual inputs from the first sensing means and the flow control means and air flow, pressure, torque, and current characteristics of the blower, the processor means being responsive to a calculated torque value for the motor to supply a signal to the switch means to control application of voltage to the motor, the voltage supplied to the motor being sufficient for the motor to produce the calculated torque, and the processor means being responsive to the inputs from the second and third sensing means to vary the signal supplied to the switch means in accordance with sensed motor operating conditions.

2. In an air handling system for delivering air by a blower system utilizing a blower and a blower motor for running the blower, the blower having air flow, pressure, torque and current characteristics, apparatus for providing a constant flow rate of air comprising:

first sensing means for sensing the operating speed of the motor;
   second sensing means for sensing the current drawn by the motor;
   third sensing for sensing a voltage applied to the motor;
   switch means for controlling application of power to the motor;
   flow control means for establishing a desired air flow rate; and,
   processor means responsive to inputs from each of the sensing means and the flow control means to determine a torque required to be produced by the motor for a predetermined air flow rate, the torque being determined as a function of the combined inputs from the first sensing means and the flow control means together with individual inputs from the first sensing means and the flow control means and air flow, pressure, torque, and current characteristics of the blower, the processor means being responsive to a calculated torque value for the motor to supply a signal to the switch means to control application of voltage to the motor, the voltage supplied to the motor being sufficient for the motor to produce the calculated torque, and the processor means being responsive to the inputs from the second and third sensing means to vary the signal supplied to the switch means in accordance with sensed motor operating conditions, the processor means determining the torque required to be produced by the motor in accordance with the formula $$torque = (K1*S*C) + (K2*S) + (K3*C) + K4,$$

where S is an input from the first sensing means representing motor speed, C is an input from the control means representing desired air flow, and K1, K2, K3, and K4 are constants for the particular blower being operated by the motor, and respectively represent air flow, torque, pressure, and speed characteristics of the blower, the torque determined by the formula including a constant offset torque which is proportional to the desired air flow rate.

3. The apparatus of claim 2 wherein the processor means comprises a microprocessor which periodically determines the motor torque required to maintain the constant air flow rate.

4. The apparatus of claim 2 wherein the processor means includes first and second multiplier means to which the input from the flow control means is supplied, and a third multiplier means to which the input from the first sensing means is supplied, the input from the first sensing means also being supplied as an input to the second multiplier means, the first multiplier means multiplying the flow control means input by the constant K3, the second multiplier means combining the respective inputs from the flow control means and first sensing means and multiplying the result by the constant K1, and the third multiplier means multiplying the input from the first sensing means by the constant K2.

5. The apparatus of claim 4 further including first summing means for additively combining an output from each of the first and second multiplier means, and second summing means for additively combining an output of the first summing means with an output of the third multiplier means.

6. The apparatus of claim 5 further including third summing means for additively combining an output of the second summing means with the constant K4.

7. The apparatus of claim 6 further including fourth summing means for additively combining an output from the third summing means with a current signal from the second sensing means.

8. The apparatus of claim 7 further including a fifth summing means for combining an output of the fourth summing means with a voltage signal from the third sensing means.

9. The apparatus of claim 8 wherein the switch means includes rate limit means for limiting the rate of change in amplitude of the voltage supplied to the motor by the switch means.

10. Air handling apparatus for delivering a volume of air at a generally constant flow rate regardless of changes in the operating conditions of an environment with which the apparatus is used comprising:
a blower for moving air from one point to another;
a blower motor for running the blower;
switch means for controlling application of power to the motor;
sensing means for sensing a voltage supplied to the motor, the current drawn by the motor, and the operating speed of the motor;
flow control means for establishing a desired air flow rate; and,
processor means responsive to the sensed voltage, current, and motor speed inputs from each of the sensing means, and an input from the flow control means to periodically determine a torque required by the motor to produce a predetermined air flow rate, the torque being determined as a function of the combined motor speed input from the sensing means and an input from the flow control means and current, torque, pressure, and air flow characteristics of the blower, the calculated torque including an offset torque value proportional to the desired constant air flow rate, and the processor means being responsive to a calculated torque value for the motor to supply a control signal to the switch means to control application of voltage to the motor, the voltage supplied to the motor being sufficient for the motor to produce the calculated torque.

11. The air handling apparatus of claim 10 wherein the processor means calculates the required torque as $$torque = (K1*S*C) + (K2*S) + (K3*C) + K4,$$

where S is a motor speed input from the sensing means, C is an air flow rate input from the flow control means, and K1–K4 are constants for the particular blower being operated by the motor, K1 representing the blower's air flow characteristics, K2 the torque characteristics of the blower, K3 the pressure characteristics of the blower, and K4 the speed characteristics of the blower, the respective constant values being derived from torque/speed curves for the blower using a double approximation of the curves.

12. The air handling apparatus of claim 11 wherein the processor means includes multiplier means to which the respective inputs from the flow control means and the sensing means are supplied, the multiplier means including a plurality of multipliers for respectively combining the inputs from the flow control means and sensing means and their associated constants.

13. The air handling apparatus of claim 12 wherein the multiplier means includes first and second multipliers to which the input from the flow control means is supplied, and a third multiplier to which the input from the sensing means is supplied, the input from the sensing means also being supplied as an input to the second multiplier, the first multiplier multiplying the flow control means input by the constant K3, the second multiplier combining the respective inputs from the flow control means and sensing means and multiplying the result by the constant K1, and the third multiplier multiplying the input from the sensing means by the constant K2.

14. The air handling apparatus of claim 13 wherein the processor means further includes first summing means for additively combining an output from each of the first and second multiplier means, a second summing means for additively combining an output of the first summing means with an output of the third multiplier means, and third summing means for additively combining an output of the second summing means with the constant K4.

15. The air handling apparatus of claim 14 wherein the processor means further includes feedback means for combining voltage and current outputs of the sensing means with the additively combined output of the multiplier means to produce the control signal supplied to the switch means.

16. The air handling apparatus of claim 15 wherein the feedback means includes fourth summing means for additively combining an output from the third summing means with a current signal produced by the sensing means, and a fifth summing means for combining an output of the fourth summing means with a voltage signal produced by the sensing means, an output from the fifth summing means comprising the control signal supplied to the switch means.

17. The air handling apparatus of claim 15 wherein the switch means includes a rate limiter for controlling the rate of increase or decrease in the amplitude of the voltage supplied to the motor by the switch means.

18. The air handling apparatus of claim 12 wherein the processor means further includes summing means for additively combining the outputs from the multiplier means.

19. The air handling apparatus of claim 11 wherein the processor means includes a microprocessor.

20. A method of controlling the operation of a blower motor in an air handling system to provide a flow rate of air delivered by a blower operated by the blower motor, the air flow rate being substantially constant over a wide range of operating conditions, the method comprising:
sensing a voltage supplied to the motor, the current drawn by the motor, and an operating speed of the motor and providing output signals representative thereof;
establishing a predetermined air flow rate and providing a flow rate signal representative thereof;
periodically processing the motor speed signal in combination with the flow rate signal to determine a torque required to be produced by the motor for a predetermined air flow rate, processing of the motor speed and flow rate signals taking to account, air flow, torque, pressure, and speed characteristics of the blower, the torque value determined including an offset torque value proportional to the desired constant air flow rate;
generating a control signal and supplying the control signal to a switch means for the switch means to, in turn, supply a voltage to the motor sufficient for the motor to produce the calculated torque; and,
modifying the control signal in response to the sensed voltage and current signals to account for motor operating conditions whereby a constant air flow rate is maintained despite changes in the system.

21. The method of claim 20 wherein processing the motor speed signal and flow rate signal includes calculating the required torque in accordance with the equation $$torque = (K1*S*C) + (K2*S) + (K3*C) + K4,$$

where S is a motor speed input from the sensing means, C is an air flow rate input from the flow control means, and K1–K4 are constants for the particular blower operated by the motor, K1 representing the blower's air flow characteristics, K2 the torque characteristics of the blower, K3 the pressure characteristics of the blower, and K4 the speed characteristics of the blower.

22. The method of claim 21 wherein combining the motor speed signal with the flow rate signal includes:
   multiplying the flow rate signal together with an air pressure constant for the blower in a first multiplier means;
   multiplying the speed control signal together with the torque constant for the blower in a second multiplier means; and,
   multiplying the speed control signal together with the flow rate signal and the air flow constant for the blower in a third multiplier means.

23. The method of claim 22 further including additively combining the results of the multiplications together, and adding the speed constant for the blower to the result to produce the control signal supplied to the switch means.

24. The method of claim 23 further including combining the current signal with the previous results to modify the control signal as a function of the current drawn by the motor.

25. The method of claim 23 further including combining the voltage signal with the previous results to further modify the control signal as a function of motor operating conditions.

26. The method of claim 25 further including limiting a rate of change of the amplitude of the voltage supplied to the motor in response to the control signal.

27. The method of claim 20 wherein processing of the motor speed signal in combination with the flow rate signal to determine a torque required to be produced by the motor for a predetermined air flow rate is performed with a microprocessor.

28. A method of controlling the operation of a blower motor in an air handling system to provide an air flow rate which is substantially constant over a wide range of operating conditions, the method comprising:
   operating a blower having a predetermined set of operating characteristics to move the air, the blower being operated by a blower motor to which a voltage is supplied;
   sensing a voltage supplied to the motor, a current drawn by the motor, and an operating speed of the motor and providing output signals representative thereof;
   establishing a predetermined air flow rate and providing a flow rate signal representative thereof;
   deriving a set of constant values representing operational characteristics of the blower by performing a double linear approximation from torque/speed curves plotted for the blower;
   processing the motor speed signal in combination with the flow rate signal to determine a torque required to be produced by the motor for a predetermined air flow rate, processing the motor speed signal and flow rate signal including calculating the required torque in accordance with the equation $$torque = (K1*S*C) + (K2*S) + (K3*C) + K4,$$

where S is a motor speed input from the sensing means, C is an air flow rate input from the flow control means, and K1–K4 are air flow, torque, pressure, and speed constants respectively derived for the particular blower being operated by the motor;
   generating a control signal which is a function of the calculated torque and supplying the control signal to a switch means for the switch means to supply a voltage to the motor sufficient for the motor to produce the calculated torque, the control signal incorporating an offset torque value which is proportional to the constant air flow rate; and,
   modifying the control signal in response to the sensed voltage and current signals to account for motor operating conditions whereby a constant air flow rate is maintained despite changes in the system.

29. The method of claim 28 wherein modifying the control signal includes sequentially combining the current signal and the voltage signal with the control signal previously produced to produce the control signal supplied to the switch means.

30. In a method of controlling the operation of a blower motor in an air handling system to provide an air flow rate which is substantially constant over a wide range of operating conditions, the method comprising operating a blower having a predetermined set of operating characteristics to move the air, the blower being operated by a blower motor to which a voltage is supplied, sensing an operating speed of the motor and providing an output signal representative thereof, and establishing a predetermined air flow rate and providing a flow rate signal representative thereof, the improvement comprising:
   deriving a set of constant values representing operational characteristics of the blower by performing a double linear approximation from torque/speed curves for the blower;
   periodically processing the motor speed and flow rate signal to determine a torque required to be produced by the motor for a predetermined air flow rate to be produced by the blower, processing the motor speed signal and flow rate signal including multiplying the flow rate signal together with a constant value representing pressure characteristics of the blower in a first multiplier means, multiplying the speed control signal together with a constant value representing torque characteristics of the blower in a second multiplier means, multiplying the speed control signal together with the flow rate signal and a constant representing air flow characteristics of the blower in a third multiplier means, and additively combining the outputs of the respective multiplier means together with each other and with a constant representing speed characteristics of the blower to produce a motor control signal having an offset torque value proportional to the constant air flow rate;
   generating a control signal which is a function of the calculated torque; and,
   supplying the control signal to a switch means for the switch means to supply a voltage to the motor sufficient for the motor to produce the calculated torque.

31. The improvement of claim 30 wherein processing the motor speed signal and flow rate signal further includes sensing the voltage supplied to the motor and the current drawn by the motor and producing respective voltage and current signals representative thereof, and sequentially combining the current signal and the voltage signal with the control signal previously produced to produce a control signal supplied to the switch means.

* * * * *